United States Patent [15] 3,679,831
Bonsky [45] July 25, 1972

[54] MULTI-LINE COUPLING SYSTEM

[72] Inventor: Elmer C. Bonsky, Long Beach, Calif.
[73] Assignee: T. A. D. Avanti, Inc., Paramount, Calif.

[22] Filed: Oct. 16, 1970
[21] Appl. No.: 81,428

[52] U.S. Cl. ....................179/2 C, 179/6 E
[51] Int. Cl. ....................H04m 11/10
[58] Field of Search..........179/2 C, 1 C, 84 L, 84 R, 18 BF, 179/6 E, 6 D

[56] References Cited

UNITED STATES PATENTS

| | | | |
|---|---|---|---|
| 3,469,036 | 9/1969 | Meri | 179/84 L |
| 3,193,620 | 7/1965 | Marheine | 179/6 E |
| 3,406,262 | 10/1968 | Grandstaff | 179/84 B |
| 3,230,316 | 1/1966 | Hunt | 179/84 R |

*Primary Examiner*—Kathleen H. Claffy
*Assistant Examiner*—David L. Stewart
*Attorney*—Jessup & Beecher

[57] ABSTRACT

An improved system and network is provided for coupling a unit, such as an electronic telephone answering unit, to a multiplicity of telephone lines. The coupling is achieved by the system in a manner such that no load is imposed on any of the telephone lines until a ringing signal is received, at which time the coupling system of the invention serves to connect the telephone answering unit to the telephone line on which the ringing signal is received and, at the same time, to impose a "-busy" connection to the other telephone lines so long as the telephone answering unit is occupied. The coupling system of the invention includes an optical relay circuit which includes a gaseous discharge lamp across each telephone line, and which glows when a ringing signal is received so as to activate an associated photocell which initiates the desired connections between the telephone lines and the telephone answering unit.

4 Claims, 2 Drawing Figures

INVENTOR.
Elmer C. Bonsky
Jessup and Beecher
By Keith D. Beecher
ATTORNEYS

MULTI-LINE COUPLING SYSTEM

BACKGROUND OF THE INVENTION

The coupling system of the present invention has particular utility when used in conjunction with electronic telephone answering units and, for that reason, it will be described in such an environment. However, it will become evident as the description proceeds that the coupling system of the invention has general utility as an optical relay which imposes no load on its energizing circuit until the relay itself is energized.

Telephone answering units have been provided which are capable of responding to a received ring signal on the telephone line, and of effectively answering the call. This is achieved by the unit causing a recorded "announcement" message to be transmitted over the telephone line to the calling party, after which the calling party has an opportunity to record his message on a magnetic recording tape in the answering unit.

A problem which has been encountered in the past is that of providing a telephone answering unit which is capable of answering calls which may be received over a multiplicity of telephone lines. Since it is not economically feasible in many installations to provide a separate answering unit for each telephone line, complex switching arrangements have been promulgated in the past whereby a single telephone answering unit may be used in conjunction with two or more telephone lines. However, these prior art coupling systems have proven to be excessively complex, and expensive.

A criterion for such a coupling system is that no load be placed on the telephone lines while the answering unit is in a stand-by condition, and yet the coupling system must be capable of responding to a ring signal on any one of the telephone lines automatically to connect the answering unit to the line on which the ring signal is received. In addition, the coupling system must be capable of placing a connection across the other telephone lines so that any calls received on the other lines will be met with a "busy" signal until the unit has completed its recording of the call on the first telephone line on which the ring signal was received.

The system of the present invention meets the foregoing criteria in a simple manner by providing a gaseous discharge device, such as a neon lamp, in circuit with each telephone line to which the telephone answering unit is to be selectively connected. The neon lamp is extinguished at the normal voltages encountered on the telephone lines, but becomes energized in response to the increased voltage due to a ring signal. The resulting illumination of the neon lamp is used in the system of the invention to activate a photocell, so that desired connections may be made, as will be described. This results in an extremely simple and inexpensive coupling system which operates with a high degree of precision and efficiency to accomplish the desired results.

DETAILED DESCRIPTION OF THE ILLUSTRATED EMBODIMENT

Figures 1, 2:
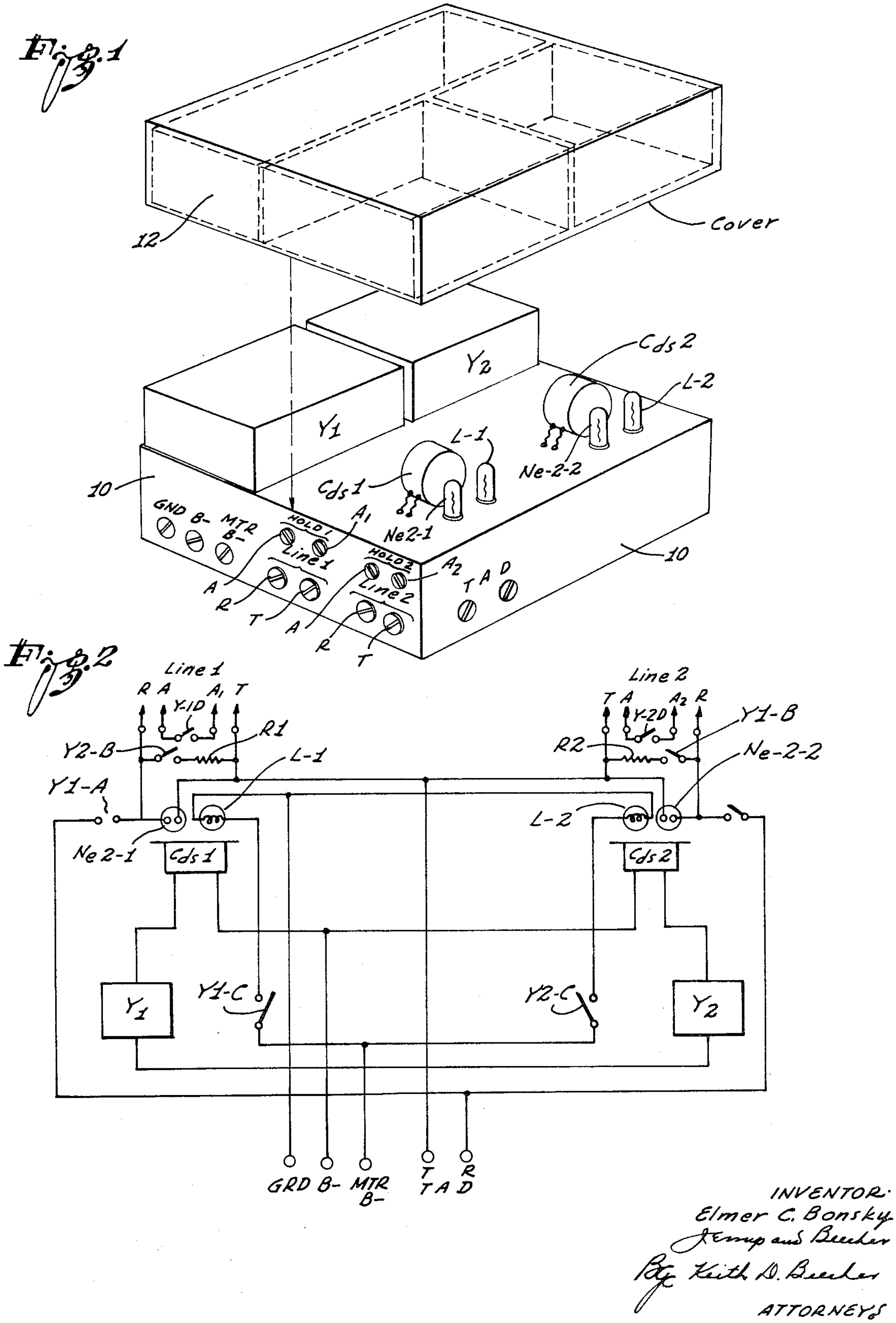
FIG. 1 is a schematic representation of a coupling unit which is constructed to incorporate the concepts and system of the present invention, and which may be interconnected, for example, between a single telephone answering unit, and two separate telephone lines.
FIG. 2 is a schematic diagram of an appropriate electronic circuit to be incorporated into the coupling unit of the invention.

The unit shown in FIG. 1, for example, includes a chassis 10. A first relay Y1 and a second relay Y2 are mounted on the chassis 10. Also mounted on the side of the chassis are a series of electrical terminals. Two pairs of terminals designated T and R respectively are intended to be connected to two separate telephone lines (designated "Line X1" and "Line X2"); and a further pair of terminals designated TAD are intended to be connected to the associated electronic telephone answering unit. Energizing connections are made to the circuitry forming the coupling system by terminals designated "GND" for ground, and separate direct-current energizing terminals designated "B–" and "MTR B–".

It might be pointed out that a single electronic answering unit may be used to respond to signals on any number of telephone lines, merely by cascading coupling units, such as the coupling unit shown in FIG. 1. For example, instead of connecting the terminals TAD directly to the electronic answering unit, these terminals may be connected to one pair of T and R terminals of a second coupling unit, and a third telephone line may be connected to the second pair of T and R terminals of the second coupling unit. Then, the TAD terminals of the second coupling unit may be connected to the electronic answering unit, so that the latter unit is conditioned to respond to signals on three telephone lines. By further cascading additional coupling units, such as the unit of FIG. 1, the telephone answering unit may be connected to any desired number of additional phone lines. An appropriate cover 12 is provided which includes internal compartments for shielding the various components from one another.

Mounted on the chassis 10 are a pair of neon lamps designated NE–1 and NE–2, and a pair of incandescent lamps designated L1 and L2. Adjacent the lamps NE–1 and L1 is a photocell Cds–1; and adjacent the lamps NE–2 and L2 is a photocell designated Cds–2. The photocell Cds–1 and Cds–2 may be General Electric photosensitive cadmium cells such as are presently marketed under the designated GE–X6; the lamps L1 and L2 may be any appropriate type of available incandescent lamp, preferably operable at a 12-volt DC level; and the lamps NE–1 and NE–2 may be any appropriate and commercially available neon lamp which is unresponsive to the normal 6–8 volt direct-current which appears across the phone line in the absence of a ring signal, but which will respond and glow in response to the alternating-current ring voltage on the phone line which is of the order of 60–100 volts AC.

It will be appreciated, therefore, that the neon lamps NE–1 and NE–2 present no appreciable load to the telephone lines under normal operating conditions, but will break down and glow in response to the ring signal, and for the duration of the ring signal, on either line. The relays Y1 and Y2 may be any type of six-pole double-throw relay, and in the particular embodiment to be described, such relays are of the 12-volt DC type.

As shown in the circuit diagram of FIG. 2, the neon lamp NE–1 is connected across the telephone line designated "line 1", whereas the neon lamp NE–2 is connected across the telephone line designated "line 2". Under normal conditions, the neon lamps NE–1 and NE–2 provide no appreciable load on either of the telephone lines. However, if a ring signal is received, for example, over line 1, the neon lamp NE–1 breaks down and is illuminated for the duration of the ring signal. The illumination of the neon lamp NE–1 causes the photocell Cds–1 to drop in resistance so that the relay Y1 which is connected in series with that photocell between the negative voltage B- and ground, is energized. The voltage B- in the particular embodiment is assumed to be of the order of –6 volts.

When the relay Y1 is energized, it closes its contact Y–1A so as to connect the telephone line 1 to the associated telephone answering unit connected across the terminals TAD. The relay Y1 also closes its contacts Y1–B to connect a resistance R2 across the other telephone line 2, the resistance R2 having a resistance, for example, of 120 ohms. At the end of the ring signal, the neon lamp NE–1 returns to its non-conductive state, and it is not affected by the incoming message. However, the relay Y1 remains energized by virtue of a holding means to be described. As long as the relay Y1 is energized, the telephone answering unit is connected to line 1, and the relay Y2 is connected across line 2, so that the messages on line 1 are transmitted to the telephone answering unit, and a "busy" condition is effectuated on line 2.

The relay Y1 also closes its contacts Y1–C to energize the lamp L1. This is achieved by connecting the lamp L1 across a 12-volt terminal designated MTR B– and ground. So long as the lamp L1 is energized, it acts as a holding means for the photocell Cds–1, to hold the relay Y1 energized. At the termination of the incoming message, the associated electronic telephone answering unit deenergizes the voltage terminal MTR B– so that the lamp L1 is extinguished, and the coupling system returns to its original state. The contacts Y1–C are not really required in many installations because the terminal MTR B– does not normally become activated until after the relay Y1 is energized.

It will be appreciated that an incoming call on the telephone line 2 preceded by a ring signal, will set up exactly the same chain of events in the circuit elements associated with the latter line.

Rather than using the lamp L–1, L–2 as a holding means, holding in units for the relays $Y_1$ and $Y_2$ may be provided and controlled by holding contacts Y–1D and Y–2D such holding circuits may be connected to terminals A–A1, A–A2.

The invention provides, therefore, an eminently simple system for selectively connecting a single telephone answering unit to a multiplicity of telephone lines, so as to constitute an efficient coupling system. The coupling system of the invention may be fabricated at a fraction of the cost of the prior art coupling systems which have been devised in an effort to achieve the same purpose.

As mentioned above, although the coupling system of the invention has been described in a particular environment, it has general utility in any application in which a switching function is to be made in response to an incoming signal, but in which no load is to be exerted on the line until the signal is received.

It will also be appreciated that while a particular embodiment has been illustrated and described, modifications may be made. It is intended to cover all such modifications which come within the spirit and scope of the invention in the following claims.

What is claimed is:

1. A coupling system adapted to be connected to a line and responsive to signals received thereon having an amplitude above a particular amplitude threshold, said coupling system including: a gaseous discharge lamp adapted to be connected across said line, said lamp being unresponsive to signals below the aforesaid amplitude threshold and adapted to be energized and illuminated in the presence of signals received over said line above said threshold; a relay having an energizing coil; photoelectric transducer means connected in circuit with said energizing coil of said relay and mounted adjacent said lamp to respond to the illumination of said lamp to activate said relay, a further lamp mounted adjacent said photoelectric transducer means, an energizing circuit for said further lamp, and a pair of contacts associated with said relay incorporated in said last-named energizing circuit to cause said further lamp to become energized upon the activation of said relay and to serve as a holding means for said relay.

2. The coupling system defined in claim 1, in which said relay means includes a pair of contacts connecting an external unit to said line upon the activation of said relay means.

3. The coupling system defined in claim 1, in which said relay means includes a pair of contacts in circuit with a further line to establish said further line in a "busy" condition upon the activation of said relay means.

4. The coupling system defined in claim 1, in which said relay includes a pair of contacts connecting an external unit to said line upon the activation of said relay, and means for de-energizing said last-named lamp upon the receipt of a signal from said external unit indicating said unit's completion of an operational cycle.

* * * * *